US007887190B2

(12) United States Patent
Van Avery et al.

(10) Patent No.: US 7,887,190 B2
(45) Date of Patent: Feb. 15, 2011

(54) METHOD AND SYSTEM FOR AN ENCLOSED, PORTABLE, VOLATILE ENVIRONMENT LASER PROJECTOR

(75) Inventors: James C. Van Avery, Renton, WA (US); Kenneth E. Irwin, III, Lake Stevens, WA (US); Paul G. Solecki, Bothell, WA (US); Reynold R. Panergo, Auburn, WA (US)

(73) Assignee: The Boeing Company, Chicago, IL (US)

( * ) Notice: Subject to any disclaimer, the term of this patent is extended or adjusted under 35 U.S.C. 154(b) by 408 days.

(21) Appl. No.: 12/024,825

(22) Filed: Feb. 1, 2008

(65) Prior Publication Data

US 2009/0195759 A1 Aug. 6, 2009

(51) Int. Cl.
*G03B 21/18* (2006.01)
(52) U.S. Cl. .......................... 353/28; 353/119; 353/121
(58) Field of Classification Search ................... 353/28, 353/119, 121
See application file for complete search history.

(56) References Cited

U.S. PATENT DOCUMENTS

| 5,425,179 A | 6/1995 | Nickel et al. ............. 33/366.16 |
| 5,425,279 A | 6/1995 | Clark et al. ................. 73/865.8 |
| 5,771,260 A | 6/1998 | Elliott et al. ................. 372/109 |
| 2002/0008697 A1 | 1/2002 | Deering ....................... 345/418 |
| 2002/0024640 A1 | 2/2002 | Ioka .............................. 353/94 |
| 2003/0198374 A1 | 10/2003 | Hagene et al. .............. 382/141 |
| 2005/0082262 A1 | 4/2005 | Rueb et al. ................ 219/121.6 |
| 2005/0121422 A1 | 6/2005 | Morden et al. ............ 219/121.6 |
| 2006/0077354 A1 | 4/2006 | Goik et al. ..................... 353/57 |
| 2009/0195753 A1* | 8/2009 | Dill et al. ....................... 353/28 |

FOREIGN PATENT DOCUMENTS

| EP | 1 719 580 | 8/2006 |
| WO | WO 2005/025199 | 3/2005 |

OTHER PUBLICATIONS

"Modular Industrial Computers, Inc: B-LASERPURGE02" Manual, (31 pgs), Oct. 2, 2007.
"MiniPurge Interface Unit (MIU/d)" Manual, (55 pgs), Jul. 12, 2007.
European Search Report and Written Opinion, dated May 6, 2009, (6 pgs).
Office Action filed in U.S. Appl. No. 12/024,853, dated Jun. 14, 2010, (10 pgs).
Canadian Official Action dated Jun. 3, 2010, (6 pgs).
Official Action issued in Applicants' related Chinese Patent Application Serial No. 200810149433.8.

* cited by examiner

*Primary Examiner*—Seung C Sohn
(74) *Attorney, Agent, or Firm*—Hayes Soloway P.C.

(57) ABSTRACT

The system contains a purge chamber. A substantially optically transparent wall is formed along the purge chamber. A laser projector is mounted within the purge chamber. The laser projector is positioned to project a laser beam through the substantially optically transparent wall. The system may be used to project images onto objects to assist in manufacturing processes.

19 Claims, 7 Drawing Sheets

METHOD AND SYSTEM FOR AN ENCLOSED, PORTABLE, VOLATILE ENVIRONMENT LASER PROJECTOR

The present disclosure is generally related to a laser projector and more particularly is related to a portable laser projector and enclosure for use in hazardous environments.

Laser projection is a useful tool in manufacturing processes. Laser projectors can be used for non-contact vision Inspection and visual pattern guidance. Laser projections are used extensively in composite ply construction for aircraft manufacturing. Rapid kitting is accomplished using laser projection to indicate locations of numerous small items on large sheets of stock. Nested parts are often cut in separate areas of a large sheet to optimize material usage. Consequently, the parts for one kit may be grouped with the parts to another. Laser projectors are used to highlight parts in sequence for kitting. Names, kit numbers and other nomenclature may also be projected.

Laser projection can eliminate the need for costly tooling, templates or layouts. The ability to view the exact location of an object without the use of additional tooling results in cost savings. Laser projected shapes can assist in outlining designs on large objects, such as planes, buses, boats and trains, for paint masking. Current methods require extensive measuring and can be painstaking and time consuming. Laser projection can provide an accurate reference line on objects for paint masking applications. However, paint booths present a problem in that various hazardous and explosive gases are associated with paint booths. Association of laser projectors with paint booths is considered a safety risk, deterring realization of the prospective cost savings of laser projection templates for paint masking.

Therefore, it would be advantageous to have a method and apparatus that overcomes the problems discussed above.

Embodiments of the present disclosure provide a system and method for laser projection in an explosive environment. Briefly described, in architecture, one embodiment of the system, among others, can be implemented as follows. The system contains a purge chamber. A substantially optically transparent wall is formed along the purge chamber. A laser projector is mounted within the purge chamber. The laser projector is positioned to project a laser beam through the substantially optically transparent wall.

The present disclosure can also be viewed as providing methods for providing laser projection in an explosive environment. In this regard, one embodiment of such a method, among others, can be broadly summarized by the following steps: projecting an image onto an object with a laser projector; operating the laser projector from within a purge chamber; projecting the image through a substantially optically transparent wall of the purge chamber; and controlling an environment within the purge chamber.

The features, functions, and advantages that have been discussed can be achieved independently in various embodiments of the present invention or may be combined in yet other embodiments further details of which can be seen with reference to the following description and drawings.

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

Figure 1:
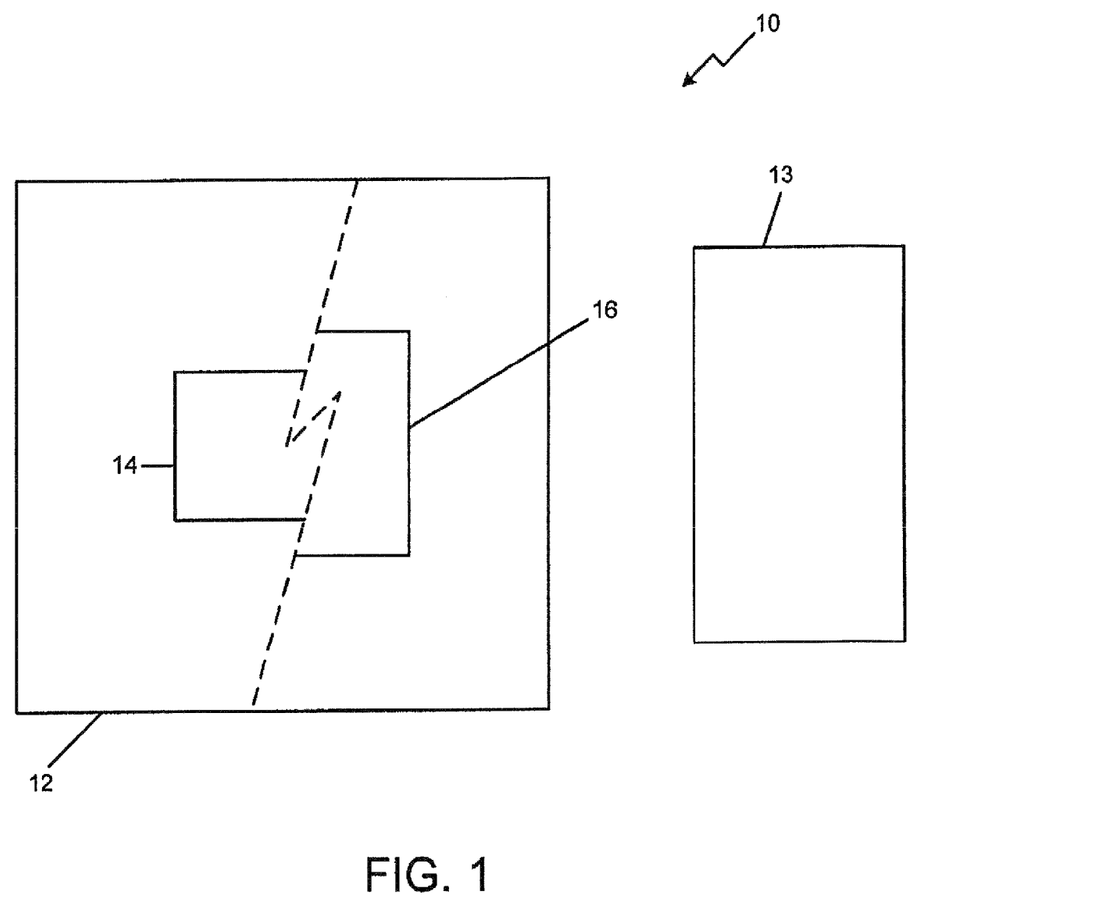
FIG. 1 is an illustration of a partial cut-away front of a system for laser projection in an explosive environment, in accordance with a first exemplary embodiment.

FIG. 1 is an illustration of a partial cut-away front of a system 10 for laser projection in an explosive environment, in accordance with a first exemplary embodiment. The system 10 contains a purge chamber 12. A substantially optically transparent wall 14 is formed along the purge chamber 12. A laser projector 16 is mounted within the purge chamber 12. The laser projector 16 is positioned to project a laser beam through the substantially optically transparent wall 14.

The purge chamber 12 maintains a positive pressure environment within the purge chamber 12 that allows for safe operation of the laser projector 16. The purge chamber 12 may be connected to one or more conduits that transmit one or more gasses into and out of the purge chamber 12. The purge chamber 12 may have one or more monitors housed therein that monitor the environment within the purge chamber 12 for the presence of hazardous or explosive gasses. The purge chamber 12 may include a device for communicating to a user the presence of hazardous or explosive gasses in the environment within the purge chamber 12 and/or automatically terminating operation of the laser projector 16 upon indication of the presence of hazardous or explosive gasses.

The substantially optically transparent wall 14 forms a window that allows the laser projector 16 to project a line, image, or other projection out of the purge chamber 12. The substantially optically transparent wall 14 may be designed of a material that allows at least partial passage of the radiation emitted from the laser projector 16. Thus, for example, if the laser projector projects a non-visible wavelength of radiation, the substantially optically transparent wall 14 need only allow transmission of that non-visible wavelength of radiation, although the substantially optically transparent wall 14 may allow transmission of a broad band of radiation wavelengths.

The laser projector 16 may be any device known in the industry for transmitting one or more beams of radiation. The laser projector 16 may include hardware and software for accurately projecting images onto uneven, three dimensional objects.

Figure 2:
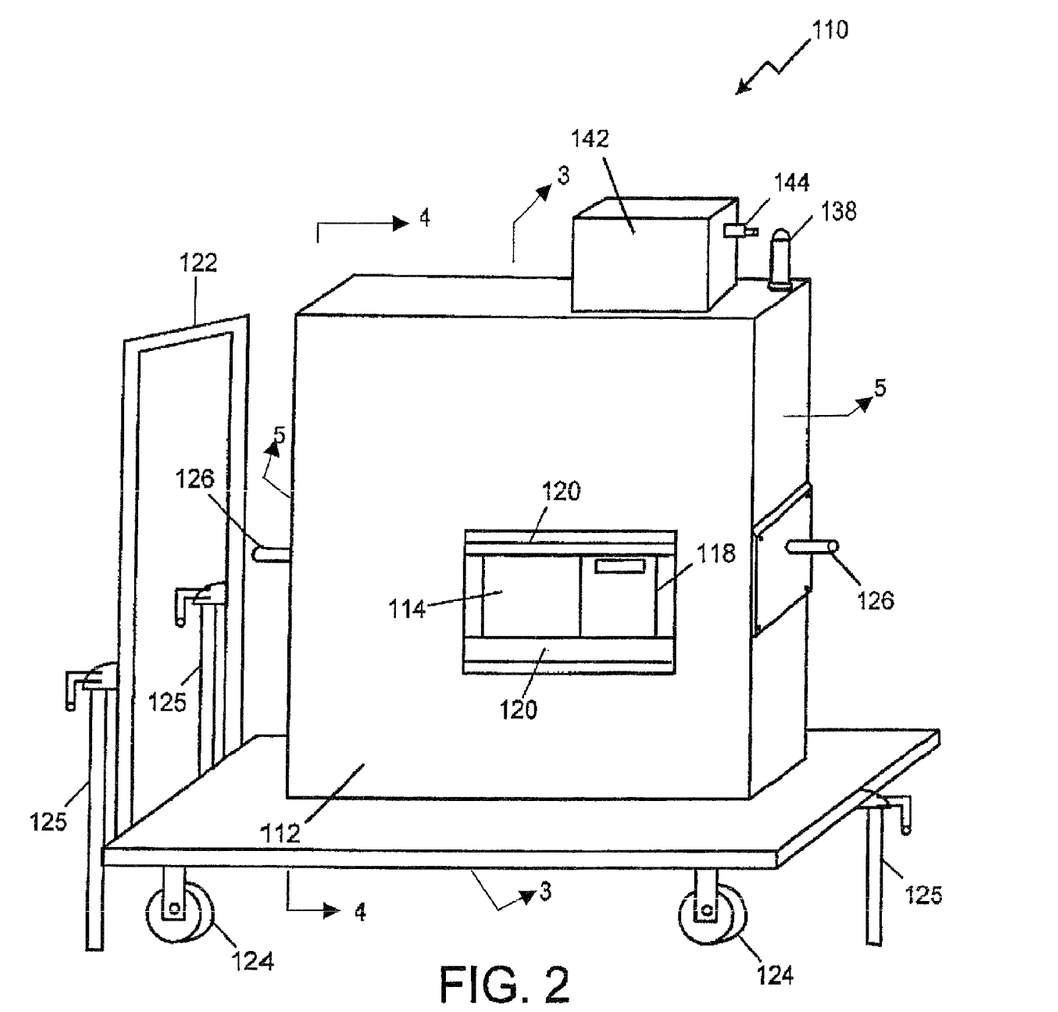
FIG. 2 is a perspective illustration of a system for laser projection in an explosive environment, in accordance with a second exemplary embodiment.

FIG. 2 is a perspective illustration of a system 110 for laser projection in an explosive environment, in accordance with a second exemplary embodiment. The system 110 contains a purge chamber 112. A substantially optically transparent wall 114 is formed along the purge chamber 112. A laser projector 116 is mounted within the purge chamber 112. The laser projector 116 (shown in FIG. 5) is positioned to project a laser beam through the substantially optically transparent wall 114.

Figure 3:
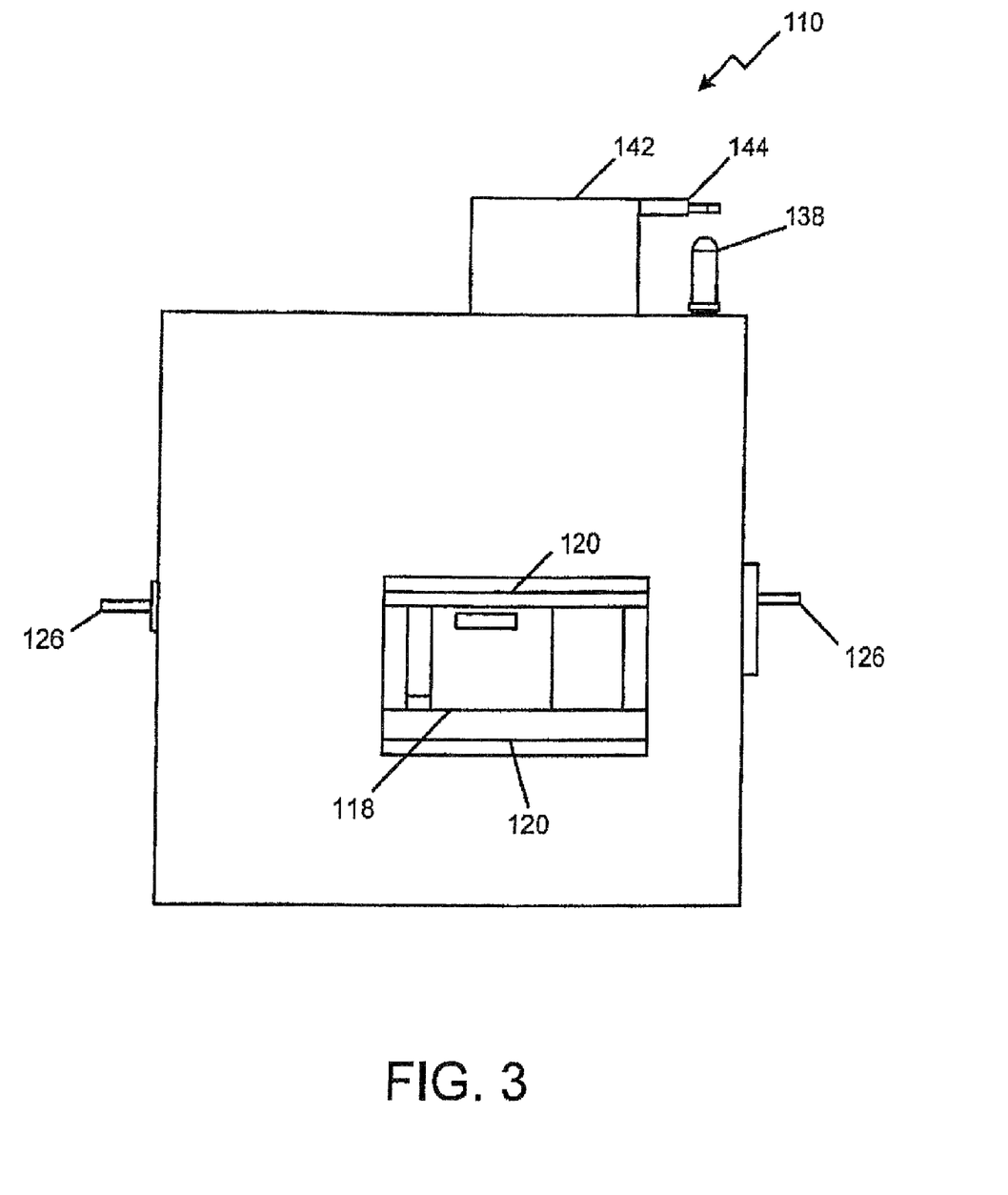
FIG. 3 is a front illustration of the system for laser projection in an explosive environment shown in FIG. 2, in accordance with the second exemplary embodiment.

FIG. 3 is a front illustration of the system 110 for laser projection in an explosive environment shown in FIG. 2, in accordance with the second exemplary embodiment. The system 110 includes a protective wall 118 movable between a first position (shown in FIG. 3) and a second position (shown in FIG. 2), wherein the first position substantially overlaps the substantially optically transparent wall 114 and the second position substantially exposes the substantially optically transparent wall 114. As the system 110 is intended for operation in hazardous sites having heavy machinery and/or painting that could harm or frustrate the purpose of the substantially optically transparent wall 114, the protective wall 118 may be utilized when practical to protect the substantially optically transparent wall 114. Protective wall 118 may open and close automatically upon activation of the laser projector.

The system 110 includes a cart 122 having a plurality of wheels 124, wherein the purge chamber 112 is mounted to the cart 122. The cart 122 allows the purge chamber 112 to be rolled to various locations for use of the laser projector 116. Cart 122 also includes at least one, and preferably three hand cranked leveling jacks for leveling the cart and lifting the cart to a stable position off the wheels once the cart is moved to a desired position.

The system 110 includes at least one pivot pin 126 mounted to an exterior surface of the purge chamber 112. As shown in FIG. 3, the purge chamber 112 may have pivot pins 126 on opposing sides of the purge chamber 112. When mounted on the pivot pins 126, the purge chamber 112 may be rotated, for instance, ninety degrees on the pivot pins 126. Providing the opportunity to rotate the purge chamber 112, provides an opportunity to rotate the laser projector 116 and project images at various angles. The pivot pins 126 may also be used to pick up the purge chamber 112 with a forklift. Not shown, at least one fork pocket may be formed in the purge chamber 112. The fork pocket may be sized to receive a fork of a forklift, allowing the purge chamber 112 to be lifted with the forklift.

The system 110 includes a wireless communications device 136 (shown in FIG. 5) mounted within the purge chamber 112 and wired to the laser projector 116. The wireless communications device 136 allows communications to the laser projector 116 through the purge chamber 112. As shown in FIG. 3, the system 110 may include an antenna 138 mounted to the purge chamber 112 at least partially exterior to the purge chamber 112. The antenna 138 is in communication with the wireless communications device 136 and may provide enhanced transmission of a signal from the wireless communications device 136. The wireless communications device 136 and antenna 138 may be commercially available wireless communications products. The wireless communications device 136 may be integral with antenna 138. The wireless communications device 136 may, for instance, be used to transmit images to the laser projector 116 for projection.

Figure 4:
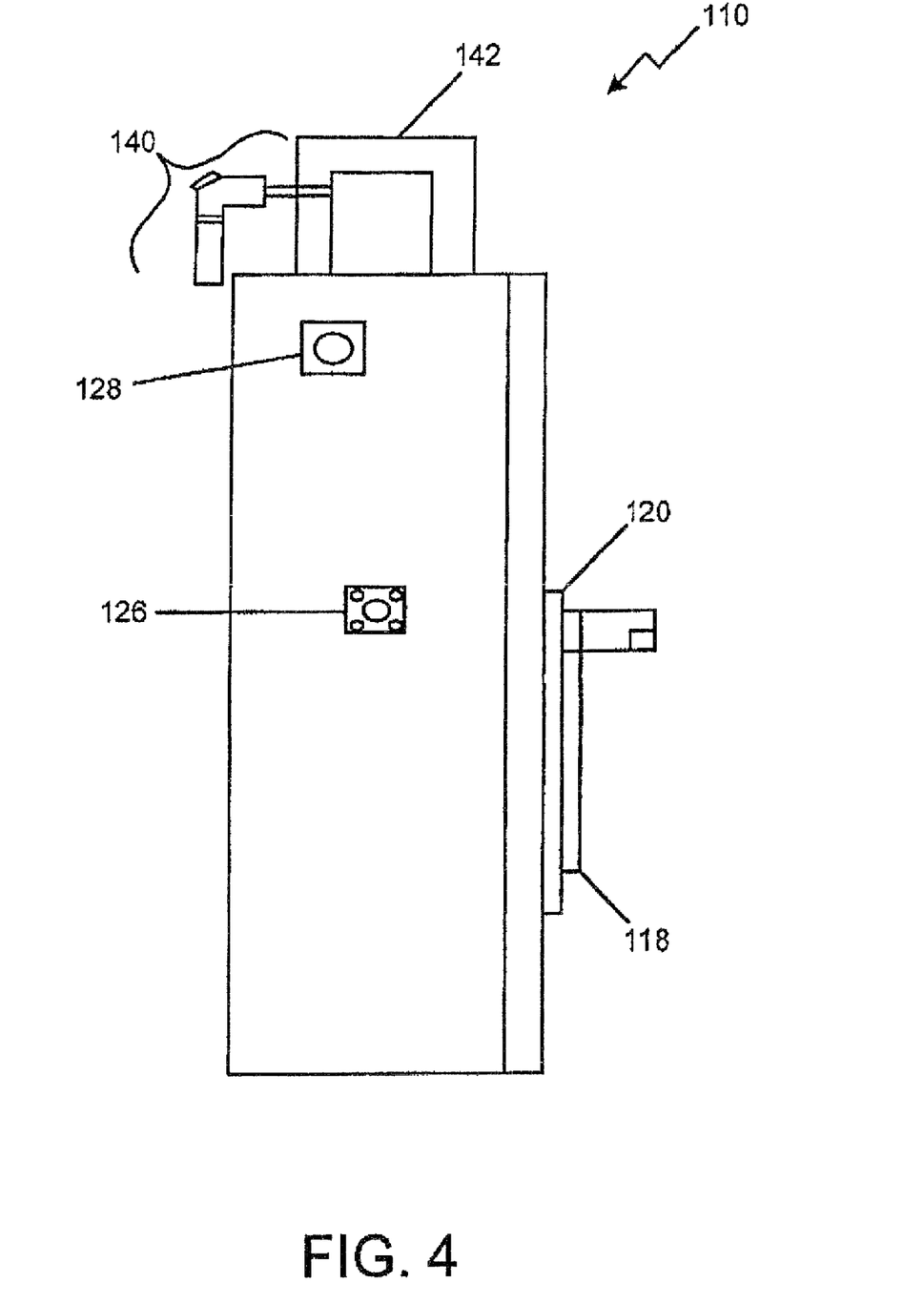
FIG. 4 is a side illustration of the system for laser projection in an explosive environment shown in FIG. 2, in accordance with the second exemplary embodiment.

FIG. 4 is a side illustration of the system for laser projection in an explosive environment shown in FIG. 2, in accordance with the second exemplary embodiment. A conduit 140 is connected to the purge chamber 112 for gas transmission. The conduit 140 is shown connected to the purge chamber 112 through a purge controller 142 mounted to the purge chamber 112. The purge controller 142 controls gas transmission through the conduit 140. The purge controller 142 may also have a release valve 144 (FIG. 3) mounted thereto. The release valve 144 may be operated to release an excess of gas pressure within the purge chamber 112.

Figure 5:
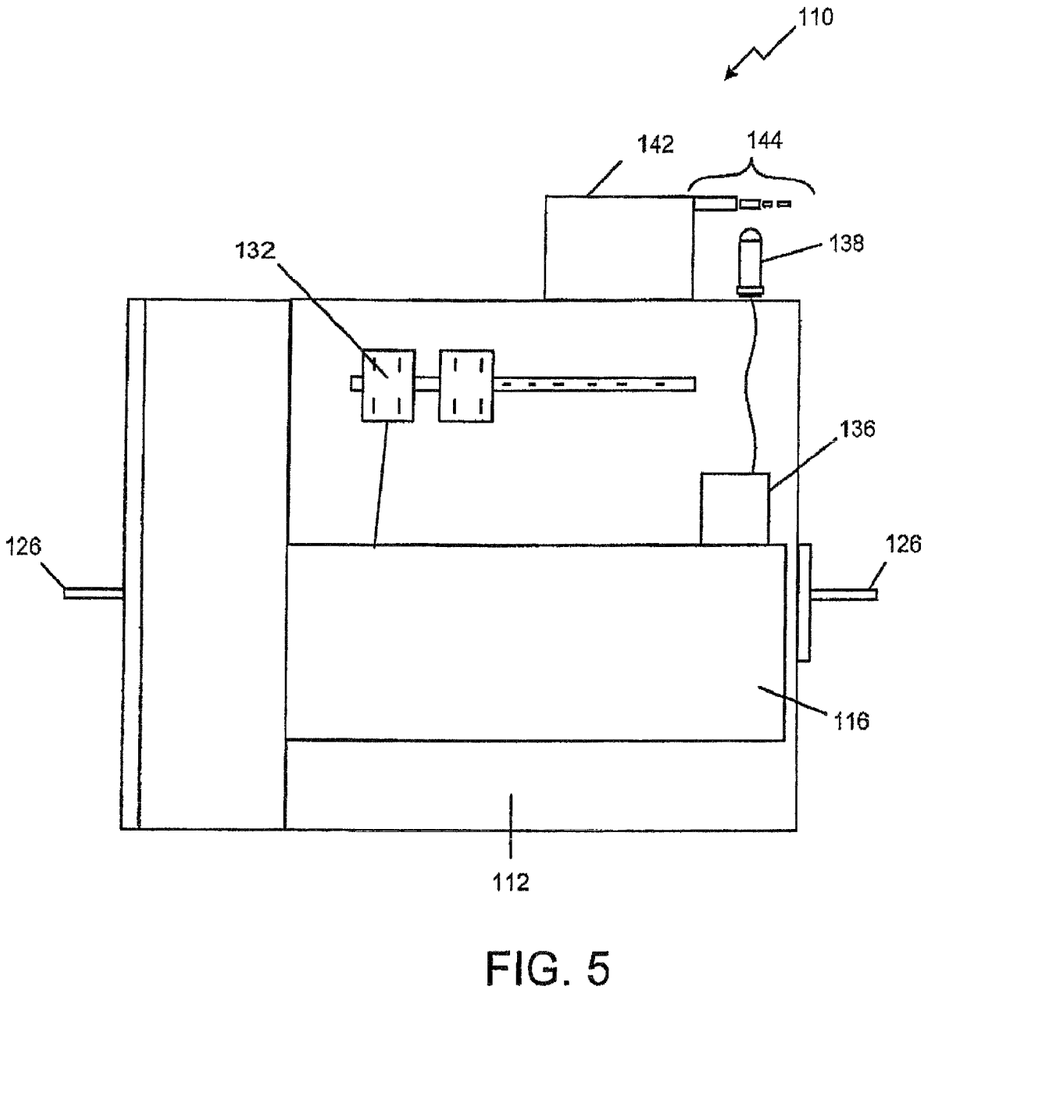
FIG. 5 is a sectional illustration of the system for laser projection in an explosive environment shown in FIG. 2, in accordance with the second exemplary embodiment.

FIG. 5 is a sectional illustration of the system for laser projection in an explosive environment shown in FIG. 2, in accordance with the second exemplary embodiment. The system 110 includes at least one data connector 128 (shown in FIG. 4) and at least one power connector formed in the purge chamber 112 to provide power and communications to the laser projector 116. As shown in FIG. 5, a power strip 132 may be mounted within the purge chamber 112 for connection to the laser projector 116. The second exemplary embodiment also shows devices for wireless communication to the laser projector 116 and, while both devices may be provided, it may be more likely that either wired or wireless communication to the laser projector 116 be provided.

Figure 6:
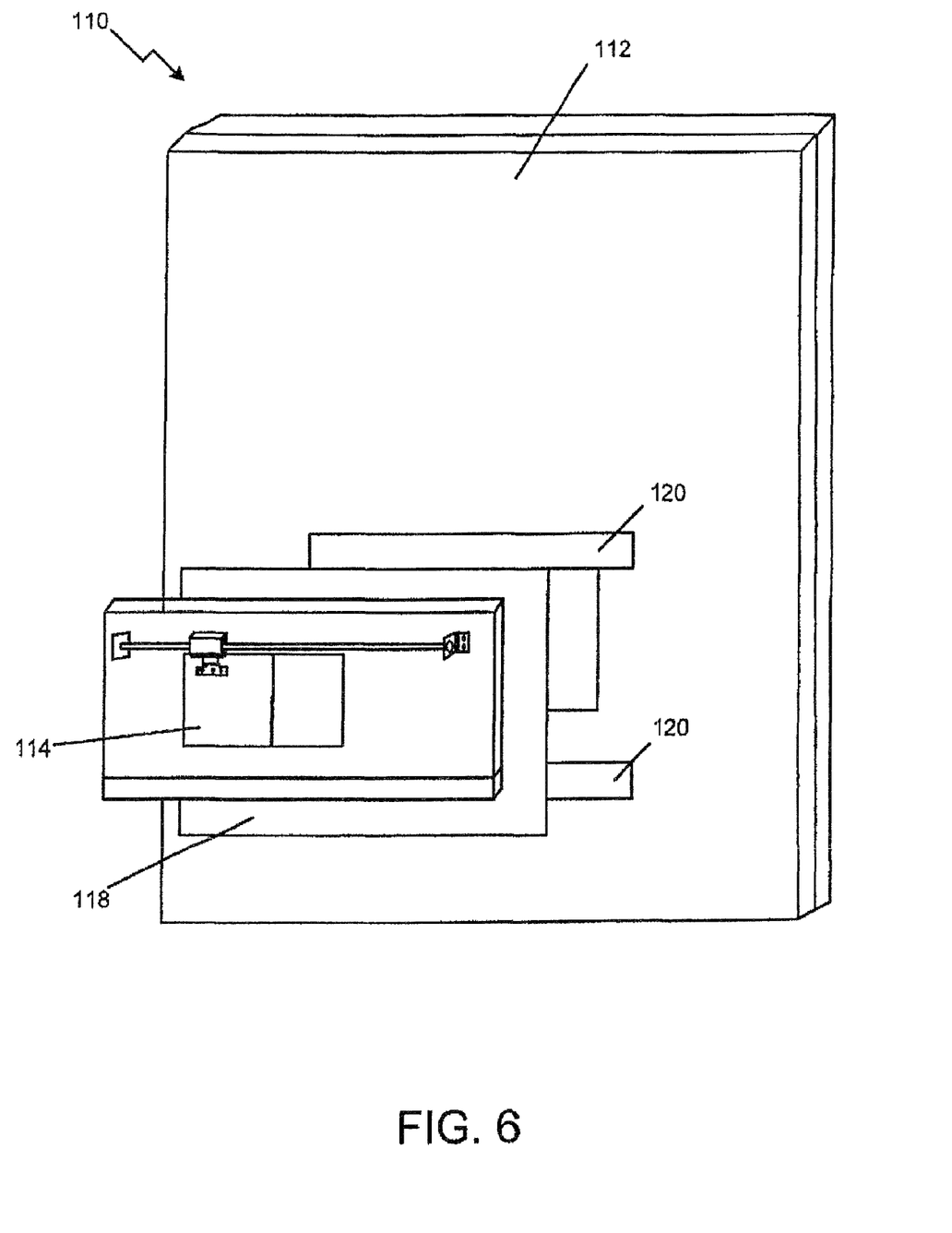
FIG. 6 is an exploded illustration of a portion of the system for laser projection in an explosive environment shown in FIG. 2, in accordance with the second exemplary embodiment.

FIG. 6 is an exploded illustration of a portion of the system for laser projection in an explosive environment shown in FIG. 2, in accordance with the second exemplary embodiment. As shown in FIG. 6, the protective wall 118 may be slidable on a pair of tracks 120. The protective wall 118 may be attached to the purge chamber 112 in various other ways, which allow the protective wall 118 to move between a position protecting the substantially optically transparent wall 114 and a position that does not obstruct it. Those other ways to attach the protective wall 118 may include devices that allow the protective wall 118 to remain attached to the purge chamber 112, such as hinges, and devices that allow removal of the protective wall 118 from the purge chamber 112, such as a threaded fastening.

Figure 7:
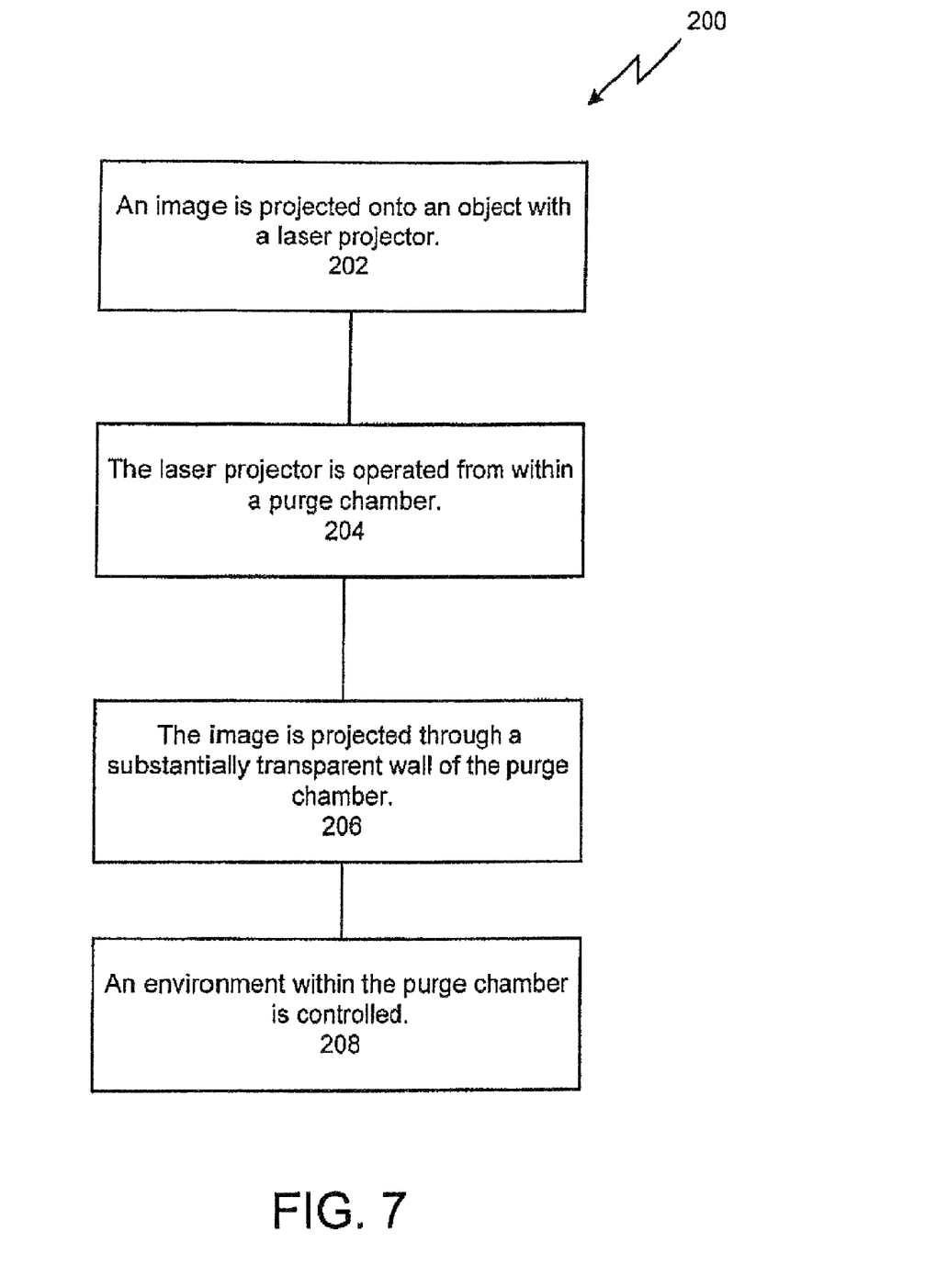
FIG. 7 is a flowchart illustrating a method of providing the abovementioned system for laser projection in an explosive environment, in accordance with the first exemplary embodiment.

FIG. 7 is a flowchart 200 illustrating a method of providing the abovementioned system for laser projection in an explosive environment, in accordance with the first exemplary embodiment. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art.

As is shown by block 202, an image is projected onto an object with a laser projector 16. The laser projector 16 is operated from within a purge chamber 12 (block 204). The image is projected through a substantially optically transparent wall 14 of the purge chamber 12 (block 206). An environment within the purge chamber 12 is controlled (block 208). This method of laser projection allows laser projection in a hazardous or explosive environment such as, for example, in close proximity to a paint booth 13.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiments of the disclosure without departing substantially from the spirit and principles thereof. All such modifications and variations are intended to be included herein within the scope of this disclosure and the present disclosure and protected by the following claims.

What is claimed is:

1. An apparatus for laser projection in an explosive environment, the apparatus comprising:
   a purge chamber;

a substantially optically transparent wall formed along the purge chamber; and a laser projector mounted within the purge chamber and positioned to project a laser beam through the substantially optically transparent wall.

2. The apparatus of claim 1, further comprising a protective wall movable between a first position and a second position, wherein the first position substantially overlaps the substantially optically transparent wall and the second position substantially reveals the substantially optically transparent wall.

3. The apparatus of claim 1, further comprising a cart having a plurality of wheels, wherein the purge chamber is mounted to the cart.

4. The apparatus of claim 1, further comprising at least one pivot pin mounted to an exterior surface of the purge chamber.

5. The apparatus of claim 1, further comprising at least one data connector and at least one power connector formed in the purge chamber to provide power and communications to the laser projector.

6. The apparatus of claim 1, further comprising a wireless communications device mounted within the purge chamber and wired to the laser projector thereby allowing communications to the laser projector through the purge chamber.

7. The apparatus of claim 6, further comprising an antenna mounted to the purge chamber at least partially exterior to the purge chamber, wherein the antenna is in communication with the wireless communications device.

8. The apparatus of claim 1, further comprising a paint booth operated proximate to the purge chamber in conjunction with operation of the laser projector.

9. The apparatus of claim 1, further comprising at least one conduit connected to the purge chamber for gas transmission.

10. The apparatus of claim 9, further comprising a purge controller mounted to the purge chamber for controlling gas transmission through the conduit.

11. The apparatus of claim 1, further comprising at least one fork pocket formed in the purge chamber, wherein the fork pocket is sized to receive a fork of a forklift.

12. The apparatus of claim 3, further comprising at least one leveling jack mounted to the cart.

13. The apparatus of claim 12, comprising three leveling jacks mounted to the cart.

14. A method for laser projection in an explosive environment, the method comprising the steps of:

projecting an image onto an object with a laser projector;
operating the laser projector from within a purge chamber;
projecting the image through a substantially optically transparent wall of the purge chamber; and
controlling an environment within the purge chamber.

15. The method of claim 14, further comprising operating a paint booth proximate to the image projected on the object.

16. The method of claim 14, further comprising concealing the substantially optically transparent wall after the laser projector stops projecting the image.

17. The method of claim 14, further comprising pivoting the purge chamber on at least one pivot pin, thereby altering an angle of projection of the laser projector.

18. The method of claim 14, further comprising communicating the image to the laser projector from a device exterior to the purge chamber.

19. The method of claim 14, further comprising filling the purge chamber with compressed air.

* * * * *